United States Patent [19]

Heshmat et al.

[11] 4,262,975
[45] Apr. 21, 1981

[54] COMPLIANT JOURNAL BEARING WITH ANGULAR STIFFNESS GRADIENT

[75] Inventors: Hooshang Heshmat, Troy; Wilbur Shapiro, Schenectady, both of N.Y.

[73] Assignee: Mechanical Technology Incorporated, Latham, N.Y.

[21] Appl. No.: 80,502

[22] Filed: Oct. 1, 1979

[51] Int. Cl.³ .......................... F16C 32/06; F16C 39/04
[52] U.S. Cl. .................................. 308/9; 308/DIG. 1
[58] Field of Search ................. 308/9, 26, 72, 73, 121, 308/DIG. 1

[56] References Cited

U.S. PATENT DOCUMENTS

| | | | |
|---|---|---|---|
| 3,366,427 | 1/1968 | Silver et al. | 308/122 |
| 3,382,014 | 5/1968 | Marley | 308/9 |
| 3,809,443 | 5/1974 | Cherubim | 308/9 |
| 3,884,534 | 5/1975 | Winn | 308/9 |
| 4,082,375 | 4/1978 | Fortmann | 308/9 |
| 4,133,585 | 1/1979 | Licht | 308/9 |
| 4,153,315 | 5/1979 | Silver et al. | 308/9 |

*Primary Examiner*—Richard R. Stearns
*Attorney, Agent, or Firm*—Joseph V. Claeys; John M. Neary

[57] ABSTRACT

A hydrodynamic compliant journal bearing for dynamically supporting a rotating shaft in a journal sleeve, includes three pads, each having a flexible bearing sheet attached to the sleeve along one edge and a resilient supporting structure attached to the sleeve under the bearing sheet for compliantly supporting the bearing sheet to support the shaft. The resilient support has a series of resilient elevations which increase in stiffness in the direction of shaft rotation so that the pad assumes a profile under hydrodynamic loading which increases in inclination with increasing shaft speed to maintain bearing stability over the full load range.

9 Claims, 3 Drawing Figures

4,262,975

COMPLIANT JOURNAL BEARING WITH ANGULAR STIFFNESS GRADIENT

BACKGROUND OF THE INVENTION

This invention relates to compliant fluid film bearings, and more particularly to a compliant hydrodynamic fluid film journal bearing. The invention is related to copending application Ser. No. 080,503 of Hooshang Heshmat entitled "Stepped, Split, Cantilevered Compliant Bearing Support" filed concurrently herewith, the disclosure of which is incorporated by reference herein.

Compliant hydrodynamic gas journal bearings are being used in high performance machinery which is subject to extreme conditions of temperature and speed. These bearings are ideally suited for these conditions because they do not suffer from the speed and durability limitations of rolling element bearings, and because they do not require oil lubrication and therefore do not require oil circulation, seals, and conditioning equipment necessary for use in oil bearings.

A compliant hydrodynamic fluid film journal bearing ordinarily employs one or more bearing pad assemblies, each including a resilient supporting element and an attached overlying bearing sheet. The pads are mounted on the inside surface of a journal sleeve in bearing relationship to a relatively rotating shaft. According to the theory of the hydrodynamic compliant fluid film bearing, a hydrodynamic supporting fluid film is generated by the relative movement of the rotating shaft over the bearing sheet of the pad to support the shaft or journal on a thin cushion of fluid. The compliance of the supporting element underlying the bearing sheet enables it to deflect to assume a profile relative to the shaft bearing surface which is productive of a supporting pressurized fluid cushion over the pad. It also enables the bearing sheet to conform, to some extent, to misaligned, unbalanced, and thermally or mechanically distorted shafts.

Despite the proven advantages that the use of these bearings confer, we have identified certain situations in which room for improvement exists. For example, high load carrying capacity for existing compliant gas bearings is generated only at relatively high speeds. Normally this is not a matter of concern because gas bearings are normally used in high speed applications. However, it would militate for longer bearing life if load capacity were generated at a lower speed to reduce the period during start-up and slow-down that the rotating member is in contact with the bearing sheet. A high load capacity at low rotor speeds would also increase the range of applications for which these bearings are applicable.

Some gas bearings which are designed for a particular range of speed, load, and temperature lose their load capacity when these ranges are exceeded. The desirability of bearings which function well at conditions considerably in excess of the design point, as well as the design point conditions, would increase the usefulness of these bearings by increasing their range of application and their safety margin, and thereby lessening the expense for redundant or larger capacity bearings.

There are certain circumstances in which some compliant journal bearings can exhibit an instability phenomenon. For example, certain designs of single pad journal bearings operating under light load at high speed and without external damping have encountered this problem. When it occurs, the effect is a substantial increase in the amplitude of the rotor gyration orbit which could ultimately cause damage to the bearing or the rotor.

SUMMARY OF THE INVENTION

Accordingly, it is an object to provide a compliant hydrodynamic fluid film journal bearing having an improved load bearing capacity and stability over a greater range of operating speeds.

These and other objects of the invention are achieved by the disclosed best modes of the invention embodied in journal bearing pads having a thin flexible metal bearing sheet supported by a compliant support element in turn supported by a journal sleeve. The bearing sheet is supported by a resilient supporting structure which is soft at its leading edge and becomes stiffer toward its trailing edge. This is achieved in the first of two embodiments by making the support element in the form of a wavy or corrugated spring, the bumps of which decrease in pitch toward the trailing edge to produce a stiffness gradient in the direction of shaft rotation. The supporting structure for the bearing sheet in the second embodiment uses a resilient support element which can be a corrugated spring type. A split stiffening element, disposed between the bearing sheet and the support element, cooperates with the support element to provide a stiffness gradient from the leading to the trailing edge. In both embodiments, the stiffness gradient enables the bearing sheet to assume a canted shape during operation, the inclination of which increases with increasing shaft speed, such that a stable, high-pressure hydrodynamic pressurized supporting gas cushion is generated over the bearing sheet of the support pads for radially supporting the shaft.

DESCRIPTIONS OF THE DRAWINGS

The invention and its many attendant objects and advantages will become more apparent upon reading the following description of the preferred embodiment when read in conjunction with an examination of the appended drawings, wherein.

DESCRIPTION OF THE PREFERRED EMBODIMENT

Figure 1:
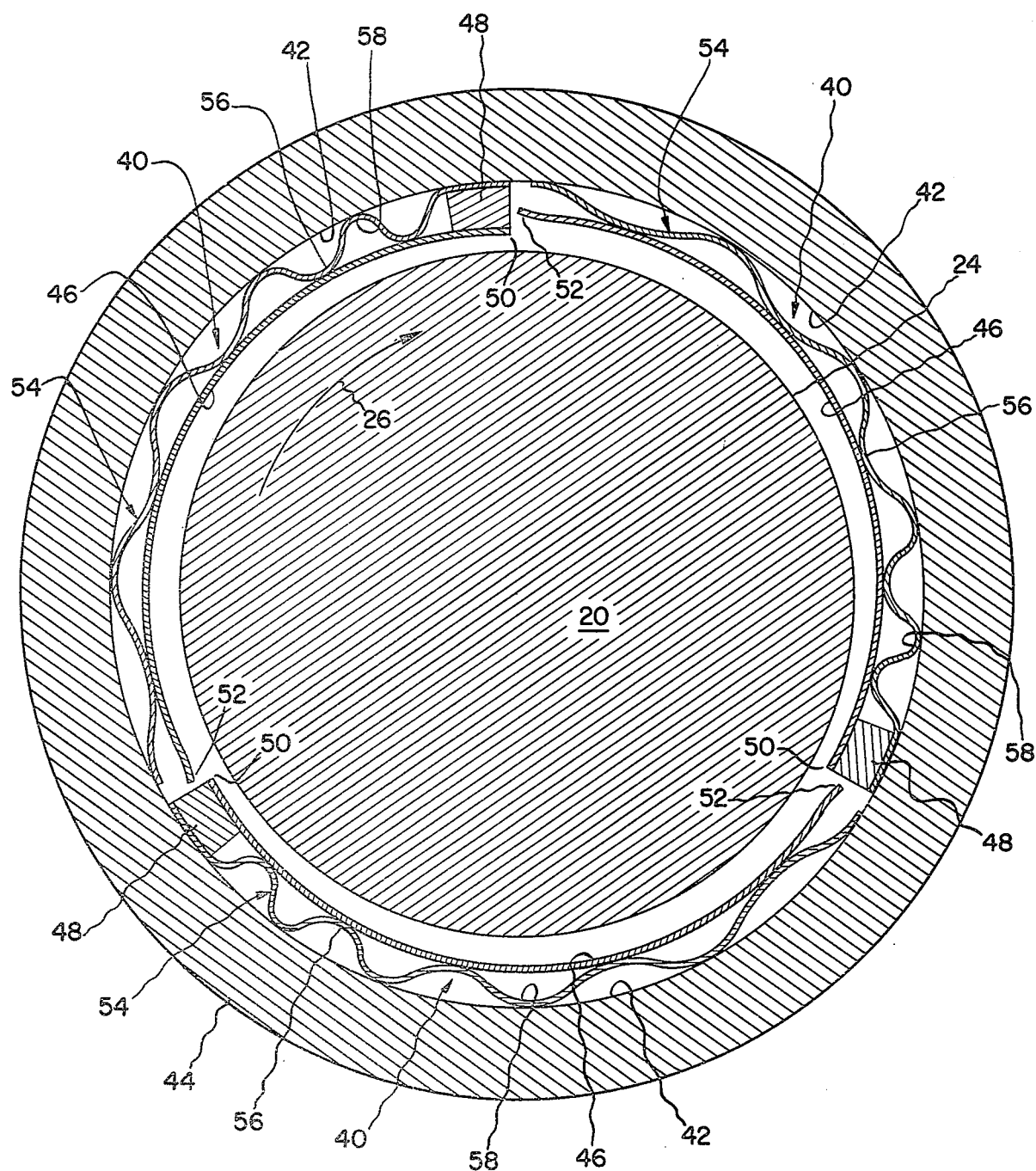
FIG. 1 is a sectional elevation of a journal bearing made in accordance with the invention.

Referring now to the drawings wherein like reference characters designate identical or corresponding parts and more particularly to FIG. 1 thereof, a compliant hydrodynamic fluid film journal bearing is shown for radially supporting a rotating shaft 20. The shaft has a bearing surface 24 and rotates in the direction indicated by arrow 26. The radial load of the shaft 20 is borne by three bearing pad assemblies 40 which are fastened to the inner surface 42 of a journal sleeve 44. The pads 40 are greatly exaggerated in size in FIG. 1 for purposes of clarity. The journal sleeve 44 is usually stationary relative to the machine frame, but in some applications it is advantageous for both the shaft and the journal sleeve to rotate; the invention is usuable with all forms of relative rotation between them.

Figure 2:
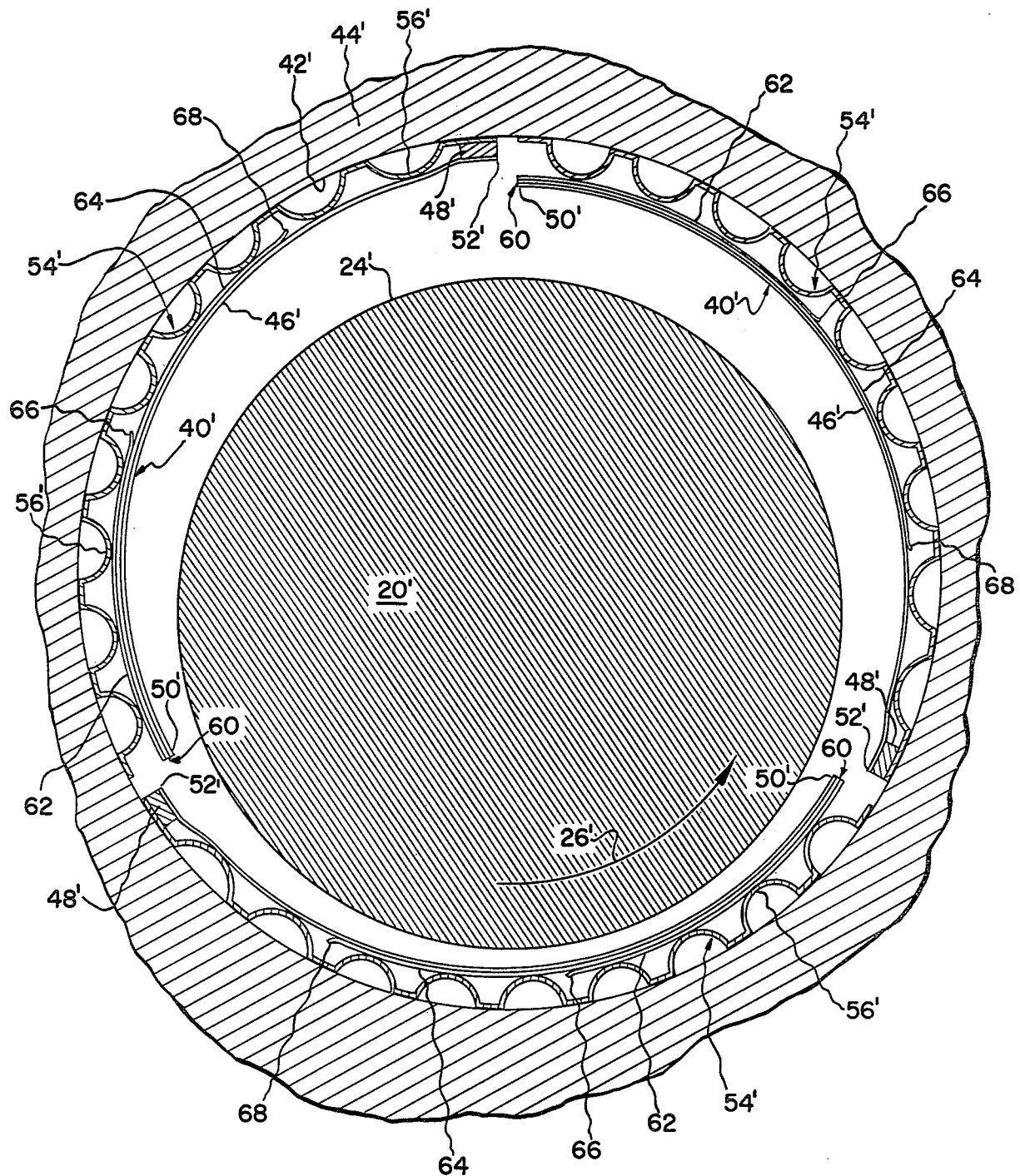
FIG. 2 is a sectional elevation of a second embodiment of a journal bearing made in accordance with this invention.

Each journal pad assembly 40 is in the form of a curved rectangle or cylindrical segment covering about one-third of the inside surface of the journal sleeve. Three pads are illustrated in FIGS. 1 and 2, however, fewer or more pads can be used. Each pad in the embodiment of FIG. 1 includes a bearing sheet 46 welded to the top surface of a spacer block 48 at the trailing edge 50 of the bearing pad in the sense of the rotation of the shaft 20, shown by arrow 26, and is free at the leading edge 52.

The rotation of the shaft 20 in the direction shown by the arrow 26 generates a hydrodynamic fluid film over the bearing pads 40 which supports the shaft and separates it from the bearing sheets 46 of the pads 40. The hydrodynamic fluid film is created by the viscous or shear forces acting in the fluid parallel to the direction of relative movement between the bearing surface of 24 the shaft 20 and the bearing surface of the bearing sheet. The bearing surface 24 of the shaft drags the boundary layer of fluid with it as it rotates over the bearing sheet, and the boundary layer in turn drags in the layer of fluid immediately adjacent to it, and in this way a velocity gradient is established in the fluid in the gap between the shaft 20 and the bearing sheet. The gap between the bearing sheet and the shaft bearing surface 24 is inherently wedge-shaped, causing the pressure of the fluid drawn into the gap to increase toward its narrow end, thus creating the pressurized cushion or fluid film which dynamically supports the rotating shaft.

The bearing sheet 46 of the pad 40 is supported on a compliant support element 54 to enable the bearing sheet to conform to the bearing surface 24 of the rotating shaft 20 despite conditions which cause permanent or transient skew between the shaft and the journal sleeve 44. These conditions include, among others, bearing or shaft misalignment, thermal distortion, centrifugal growth of the shaft, and rotor runout due to eccentric loads or rotor imbalance. The compliant support element 54 can deflect and recover to support the bearing sheet in correct hydrodynamic relationship to the bearing surface 24 of the rotating shaft 20 despite these conditions.

The resilient support element 54 is in the form of a corrugated or wavey spring having resilient elevations or ridges 56 separated by valley floors 58. The conformance of the bearing sheet 46 to the bearing surface 24 of the shaft 20 is faciliated by slitting the support element 54 into a plurality of axially adjacent strips 59, best shown in FIG. 3, each extending in the direction of the motion of the shaft surface relative to the bearing sheet. The strips may be formed from a single sheet by slitting the sheet prior to forming into the corrugated form, almost but not quite to the leading edge of the support element 54. Alternatively, the strips 50 may be formed of different materials or different gauges of the same material to provide a variation in stiffness of the support element in the axial direction. For example, the stiffest strips may be located in the center where the greater load is concentrated, and the soft strip would be located on the axial end where the load is lightest and the greatest need for compliance to accommodate misalignment exists. The support element 54 is fastened to the inside surface 42 of the journal sleeve 44 as by mechanical attachment or welding. As shown, the trailing edge of the support element 54 is welded to the sleeve 44 and the spacer block 48 is welded over the welded end of the support element 54.

The support element 54 varies in stiffness along its length, that is, in the direction of shaft rotation. This is accomplished in the first embodiment by varying the pitch of the bumps of the support element along its length. The stiffness of the bumps increase with decreasing pitch to produce a softer support at the leading edge 52. In addition, the spacer block 48 is attached at the trailing edge of the pad and lends considerable stiffness to the adjacent region by virtue of the cantilever attachment of the bearing sheet which itself is thereby rendered stiffer at its trailing edge and becomes softer toward its leading edge.

In operation, the free leading edge of the bearing pad will deflect readily under hydrodynamic load and the deflection will decrease toward the rigid trailing edge which will deflect not at all. The resulting shape is a canted pad profile as shown in FIG. 1. The angle of inclination of the pad relative to the bearing surface 24 of the shaft 20 increases with increasing hydrodynamic load.

The canted profile provides highly stable operation for a hydrodynamic fluid film journal bearing. The optimum angle of the pad relative to the shaft bearing surface increases with increasing shaft rotation speed, and this is accomplished in the embodiment of FIG. 1 by the stiffness gradient of the support element 54 which causes the pad inclination to increase with increasing rotor rotation speed so the operation of the bearing throughout its speed and load range remains stable.

Figure 3:
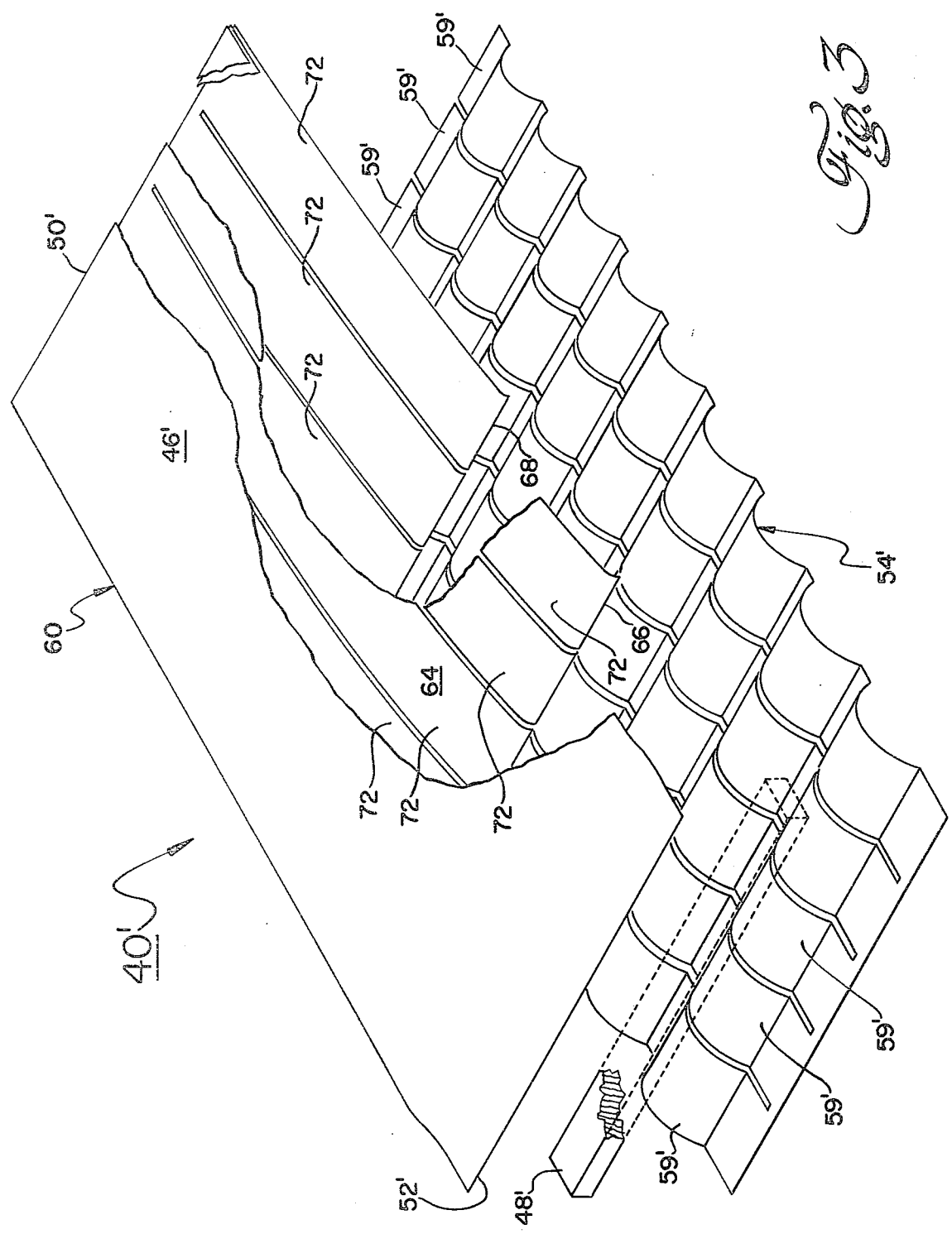
FIG. 3 is a perspective view of one of the pads in FIG. 2.

The second embodiment of the invention shown in FIGS. 2 and 3 achieves the stiffness gradient by the use of a stiffening element 60 and stiffer bumps on the support element 54' toward the trailing edge of the pad. The stiffening element 60 is disposed between the support element 54' and the bearing sheet 46'. The purpose of the stiffening element 60, as more fully discussed below, is to augment and modify the distribution of support pressure provided for the bearing sheet 46' over the area of the bearing pad in such a way as to optimize the support characteristics for the bearing sheet so that its deflection under load is not detrimental to its ability to generate a hydrodynamic pressurized cushion over its surface in the presence of rotation of the shaft 20, but rather deflects to a profile which actually improves the load capacity and stability of the journal pad assembly 40'. In addition, the stiffening element improves the damping characteristics of the bearing pad to absorb vibration energies and prevent the bearing sheet from vibrating at fractions or multiples of its resonant frequency at high rotor speed.

The stiffening element 60 includes a first flat stiffener sheet 62 lying over and supported directly by the trailing portion of the support element 54', and a second stiffener sheet 64 lying over and supported by the first stiffener sheet 62 and a portion of the support element forward of the leading edge of the first stiffener sheet 62. The first stiffener sheet 62 underlies the second stiffener sheet 64 and approximately one-third to one-half of the bearing sheet 46'; the second stiffener sheet 64 underlies and directly supports about one-half to two-thirds of the area of the bearing sheet 46'.

The leading edges 66 and 68 of the first and second stiffener sheets 62 and 64 respectively are formed in a slightly downwardly curving bend to avoid a sharp demarkation line of the support provided for the bearing sheet 46' to prevent any stress concentrations which such a sharp demarkation line might produce. The first and second stiffener sheets 62 and 64 are welded along their trailing edges to the trailing edge of the bearing sheet 46'. The stiffener sheets are slit into parallel adjacent strips 72 which are aligned vertically over the strips 59 of the support element as shown in FIG. 3 to provide the compliance in the axial direction that will enable the bearing pad to deflect locally without affecting or being affected by axially adjacent portions of the pad.

The effect of this combination is to cause the pad to tilt or cant about its trailing edge 50' to produce a wedge-shaped gap between the bearing sheet 46' and the bearing surface 24' of the shaft 20'. The increasing stiffness is produced because the ridges or bumps 56' are themselves stiffer toward the trailing edge 50' by virtue of their shape. That is, they decrease in height and increase in pitch to accommodate the thickness of the stiffener sheets and to provide a gradient of increasing stiffness from leading toward trailing edges of the pad 40'. The stiffener sheets 62 and 64 also increase the support stiffness for the bearing sheet from leading toward trailing edge. The portion of the top stiffener sheet 64 extending beyond the bottom stiffener sheet 62 provides increased stiffness to the support for the bearing sheet over that provided by the bumps alone, and this stiffness increases toward the next trailing bump by virtue of the cantilevered or overhanging disposition of the forward end of the stiffener sheet 64 over the next bump. Likewise, the forward portion of the bottom stiffener sheet 62 overhangs the fourth bump to provide a springy and increasingly stiff support to the bearing sheet 46' from leading to trailing edge.

Two stiffener sheets are shown, but the use of more than two, indeed as many as ten sheets, is contemplated. These sheets would be arranged in the same overlapping tiered or inverse terraced array as shown for two stiffener sheets, but the sheets would be thinner and overlap each other by a smaller amount. The damping is improved with more stiffener sheets.

A journal bearing made in accordance with the above description provides improved load support, improved tolerance of a misaligned or distorted shaft bearing surface, and a greater freedom from metal fatigue and hot spots. These improvements are believed to be explained by the following theoretical description of the operation of the bearing. This description is provided for the purpose of elucidation and is not to be regarded as a limitation to the claims not expressly so limited.

In operation, the shaft 20' at rest lies against the bearing sheets 46' of the pads 40' in the journal sleeve 44. When the shaft 20' of the rotor starts to turn, the bearing surface 24' slides across the bearing surface of the bearing sheet 46' in the direction of the arrow 26'. The profile of the bearing sheet 46' relative to the bearing surface 24' of the shaft 20' at this time inherently provides a converging tapered or wedge-shaped gap in the direction of shaft rotation which facilitates the generation of a supporting hydrodynamic fluid film.

As the hydrodynamic supporting fluid film pressure increases over the bearing sheet because of the increasing speed of the shaft 20', the support element 54' and the stiffening element 60 begin to deflect. The pressurized cushion of fluid first deflects the softest portion of the pad which is its leading edge to cause it to cant relative to the shaft bearing surface 24'. The stiffening element and the stiffer bumps at the trailing section of the pad enables the load to be distributed evenly over the trailing portion of the support element 54' to produce the desired canted shape.

The structure of the pad assembly is selected to promote these changes of bearing surface forms under the changing speed and load conditions of the shaft 20'. The use of two stiffener sheets, with the top sheet extending from the trailing edge toward the leading edge farther than the bottom sheet and connected only at their trailing edges, and a support element having resilient elevations that increase in stiffness from leading to trailing edge provides a stiffness gradient for the bearing sheet 46' which is most compliant at the leading edge and becomes stiffer toward the trailing edge. By using separate sheets connected only at the trailing edge, the sheets can slide relative to one another when they bend to enable them to bend without merely flattening the corrugated support element while providing sufficient support to prevent the bearing sheet from deflecting into the valleys of the corrugated support element, which would be detrimental to the load carrying capacity of the pad assembly.

The relative motion of the stiffener sheets also provides a damping effect. The damping absorbs energy which is believed to originate from small imperfections in the rotor surface. These imperfections introduce a perturbation in the fluid film over the bearing sheet, experienced by the sheet as a series of periodic impulses which grow in strength and frequency as the rotor speed increases. When the strength of these impulses become significant and the frequency approaches the natural frequency of the bearing sheet, the amplitude of its vibrations increase greatly. These vibrations are detrimental to the operation of the bearing and it is for their attenuation that the damping is provided. The damping is particularly effective for this purpose because it increases proportionately with the force of the effect which it is designed to mitigate. That is, as the strength of the impulses increase, they will force the stiffener sheets together harder and also cause greater relative motion between them by creating a traveling wave across the bearing sheet and its supporting structure. This increased motion of the stiffener sheets relative to each other and relative to the bearing sheet and bump foil and the greater force at the rubbing interface causes greatly increased coulomb damping just when it is most needed.

The slits in the support element 54' and the stiffener sheets 62 and 64 enable the stiffener sheets and the support element to deflect individually as separate strips so that deflection of one portion of the support element 54' or the stiffener sheets does not affect the axially adjacent portions. This permits the support element and stiffener sheets to act under the influence of the hydrodynamic load immediately above it and assume the correct profile to carry that load without being raised, lowered, or twisted by deflections of adjacent portions of the support element or stiffener sheets.

The stiffness gradient of the support for the bearing sheet 46' need not be uniformly progressive from leading to trailing edge. For example, it may be desirable to make the support stiffness in the region of the trailing several bumps be identical, or increase in stiffness only slightly. It should also be noted that the pad is actually stiffest at the leading edge in the embodiment of FIGS. 2 and 3 where the bearing sheet 46' is welded to the solid spacer block 48', but the spacer block does not form an active part of the bearing in either embodiment; the active portion of the pad is in both embodiments softest at the leading edge and increases in stiffness toward the trailing edge.

As a consequence of the aforementioned structure, it is possible to build a bearing pad assembly having a high load carrying capacity with a light gauge bearing sheet. This makes the bearing sheet more responsive to changing load conditions without deflecting into the valleys of the corrugated support element.

The stiffener sheets are both formed of thinner gauge material than the bearing sheet. The stiffener element is thus strong enough to support the bearing sheet between the ridges of the support element but flexible enough to bend under the influence of the nonuniform hydrodynamic pressure profile over the bearing sheet. It also provides an inexpensive and effective manner of establishing a stiffness gradient for the support element from the leading toward the trailing edge and stabilizing the bearing sheet against resonant vibrations.

The corrugations of the support element 54 lie parallel to the trailing edge of the bearing pad assembly. This provides a flat straight lip for the support of the trailing edge of the bearing sheet and stiffener element along the line on which they are welded. By forming the leading edges of the stiffener sheets parallel to the direction of the corrugations, it is possible to lay the leading edge of the stiffener sheets over the valleys of the support element so that a sharp demarkation of support for the bearing sheet does not occur at the leading edge which might otherwise tend to cause a sharp line along which abrasion and heat from a rotating shaft surface in contact with the bearing sheet could be concentrated and damage the bearing sheet.

The bearing disclosed herein is thus able to generate a stable load supporting fluid film over the bearing surfaces at high speeds because of its greater compliance at the leading edge and stiffness at the trailing edge which enables it to assume a canted profile which increases inclination with increasing shaft speed. This militates for the generation of broad high-pressure stable supporting fluid films over the surface of the bearing sheet without deflecting between the support points of the support element. The damping provided by the stiffener sheets offers greatly improved stability to the bearing without the need of external or complicated extra damping.

Obviously, numerous modifications of variations of the disclosed embodiments are possible in view of the teachings herein. Therefore, it is expressly to be understood that these modifications and their equivalents may be practiced while remaining within the spirit and scope of the appended claims, wherein

I claim:

1. A hydrodynamic compliant journal bearing for dynamically supporting a rotor in a journal sleeve on a plurality of compliant journal bearing pads affixed to the inside surface of the journal sleeve, each of said pads comprising:
   a flexible sheet metal bearing sheet having a bearing surface in bearing relationship to said rotor and operatively attached to the sleeve along one edge of said bearing sheet extending transversely to the direction of rotation of the rotor;
   a resilient supporting structure, operatively fixed to the sleeve and lying between said bearing sheet and the sleeve for resiliently and compliantly supporting said bearing sheet;
   said supporting structure including a support element having resilient elevations projecting therefrom and operatively supporting said bearing sheet;
   said supporting structure varying in stiffness along its length from leading toward trailing edges thereof, in the sense of the direction of rotor rotation, establishing a stiffness gradient which increases from said leading edge toward said trailing edge to produce a pad profile, under hydrodynamic loading, that is canted with respect to the rotor surface, said canted profile sloping toward the rotor surface from leading to trailing edge in operation with an inclination which increases with increasing rotor rotation speed;
   whereby the operation of the bearing throughout its speed and load range is stable.

2. The bearing defined in claim 1, wherein:
   said support element elevations are spaced apart a distance which decreases toward said trailing edge of said pads.

3. The bearing defined in claim 2, wherein:
   said support element is a corrugated sheet spring member, and said resilient elevations are ridges separated by valleys extending generally parallel to said leading and trailing edges.

4. The bearing defined in claim 3, wherein said bearing sheet is operatively attached to the journal sleeve only at the trailing edge of said bearing sheet, whereby the cantilever attachment of said bearing shaft contributes to said stiffness gradient.

5. The bearing defined in claim 4, wherein said support element is attached to said journal sleeve at the trailing edge of said support element.

6. The bearing defined in claim 1, wherein said support structure includes a stiffening structure, including:
   a first stiffener sheet having a leading edge and a trailing edge, said first stiffener sheet lying upon said support element with said trailing edge thereof aligned with said trailing edge of said bearing sheet, and extending toward said bearing sheet leading edge; and
   a second flat stiffener sheet having a leading edge and a trailing edge, said second stiffener sheet lying between said first stiffener sheet and said bearing sheet and extending forwardly toward said bearing sheet leading edge, substantially beyond said first stiffener sheet, but short of the forward edge of said support element.

7. The bearing defined in claim 6, wherein said first and second stiffener sheets' leading edges lie between said elevations of said support element.

8. The bearing defined in claim 6, wherein said resilient elevations are graduated in height, decreasing from said leading edge toward said trailing edge of said bearing sheet sufficiently to accommodate the thickness of said stiffener sheets, and increasing in stiffness.

9. The bearing defined in claim 6, wherein said support element includes a plurality of cuts therein extending generally parallel to the direction of rotor rotation dividing said support element into at least three strips; and said stiffener sheets each include a plurality of cuts therein extending generally parallel to said support element cuts and dividing said stiffener sheets into a plurality of strips, said cuts in said first stiffener sheet being aligned with said cuts in said second stiffener sheet and said support element.

* * * * *